(12) United States Patent
Meier et al.

(10) Patent No.: US 10,437,312 B2
(45) Date of Patent: Oct. 8, 2019

(54) SYSTEM, METHOD AND DISPLAY DEVICE FOR MANAGING THE OCCUPATION OF SHARED SPACES

(71) Applicant: Roomz SA, Fribourg (CH)

(72) Inventors: Roger Meier, Granges-Paccot (CH); Andreas P. Friedrich, Metz-Tessy (FR)

(73) Assignee: ROOMZ S.A., Fribourg (CH)

(*) Notice: Subject to any disclaimer, the term of this patent is extended or adjusted under 35 U.S.C. 154(b) by 52 days.

(21) Appl. No.: 15/755,238

(22) PCT Filed: Aug. 31, 2016

(86) PCT No.: PCT/EP2016/070531
§ 371 (c)(1),
(2) Date: Feb. 26, 2018

(87) PCT Pub. No.: WO2017/037125
PCT Pub. Date: Mar. 9, 2017

(65) Prior Publication Data
US 2018/0267594 A1 Sep. 20, 2018

(30) Foreign Application Priority Data
Aug. 31, 2015 (EP) ..................................... 15183191

(51) Int. Cl.
*G06Q 10/02* (2012.01)
*G06F 1/3234* (2019.01)
(Continued)

(52) U.S. Cl.
CPC ............ *G06F 1/3265* (2013.01); *G06F 3/147* (2013.01); *G06Q 10/02* (2013.01);
(Continued)

(58) Field of Classification Search
CPC ... G06F 1/3265; G06F 3/147; G06Q 10/0631; G06Q 10/109; G06Q 10/08; G06Q 10/02;
(Continued)

(56) References Cited

U.S. PATENT DOCUMENTS 8,185,762 B1* 5/2012 Spangler ............... G06F 1/3265
713/323
8,930,067 B1* 1/2015 Green .................. G06Q 20/127
701/33.2
(Continued)

FOREIGN PATENT DOCUMENTS

EP        2 479 958        7/2012
WO    WO 03/083613      10/2003
(Continued)

OTHER PUBLICATIONS

"Concierge Display", Retrieved from the Internet: URL: http://www.fischerkerrn.com/products/concierge-services, XP003027048, pp. 1-8, Nov. 30, 2009.
(Continued)

*Primary Examiner* — Carolyn R Edwards
(74) *Attorney, Agent, or Firm* — DLA Piper LLP (US)

(57) ABSTRACT

A system and method for managing occupation of a shared space using a management system comprising a display device located at the shared space and a server, wherein the display device and the server include first interfaces configured for exchange of data and lower power second interfaces configured for signaling the presence of data to be exchanged, where the first interface is in an active mode by default and is placed into an active mode when the server sends a signal to the display device via the second interfaces, or when a user performs an action at the display device, that indicates there is data to be exchanged between the display device and the central server.

20 Claims, 2 Drawing Sheets

(51) Int. Cl.
*G06Q 10/06* (2012.01)
*G06Q 10/08* (2012.01)
*G06Q 10/10* (2012.01)
*G06F 3/147* (2006.01)
*G08B 5/36* (2006.01)

(52) U.S. Cl.
CPC ......... *G06Q 10/0631* (2013.01); *G06Q 10/08* (2013.01); *G06Q 10/109* (2013.01); *G08B 5/36* (2013.01); *G09G 2330/022* (2013.01); *G09G 2370/022* (2013.01); *G09G 2370/025* (2013.01); *G09G 2370/042* (2013.01); *G09G 2370/16* (2013.01)

(58) Field of Classification Search
CPC ....... G09G 2370/042; G09G 2370/022; G09G 2370/16; G09G 2330/022; G09G 2370/025; G08B 5/36
See application file for complete search history.

(56) References Cited

U.S. PATENT DOCUMENTS

| | | | | |
|---|---|---|---|---|
| 2003/0210240 | A1* | 11/2003 | Lacayo | G06F 3/1423 345/212 |
| 2007/0162315 | A1* | 7/2007 | Hodges | G06Q 10/02 705/7.12 |
| 2007/0299966 | A1* | 12/2007 | Crawford | G06Q 10/02 709/224 |
| 2008/0114844 | A1* | 5/2008 | Sanchez | G06F 9/543 709/206 |
| 2008/0198098 | A1* | 8/2008 | Gelbman | G06F 3/147 345/59 |
| 2010/0070314 | A1* | 3/2010 | Jethani | G06Q 10/02 705/6 |
| 2011/0084951 | A1* | 4/2011 | Karhuketo | G06F 1/3203 345/211 |
| 2012/0089722 | A1* | 4/2012 | Enholm | G06Q 10/00 709/223 |

FOREIGN PATENT DOCUMENTS

| | | |
|---|---|---|
| WO | WO 2009/13858 | 8/2009 |
| WO | WO 2010/151211 | 12/2010 |

OTHER PUBLICATIONS

International Search Report Issued in International Application No. PCT/EP2016/070531 dated Nov. 28, 2016.

Written Opinion Issued in International Application No. PCT/EP2016/070531 dated Nov. 28, 2016.

* cited by examiner

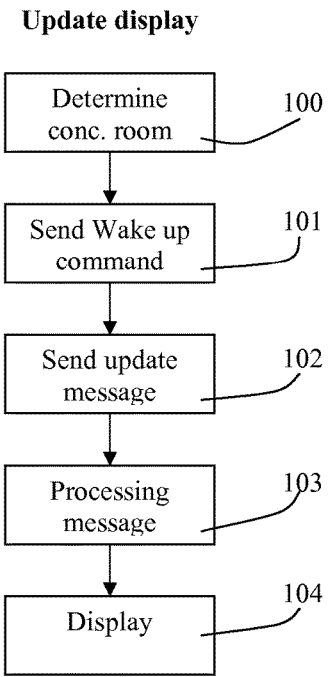
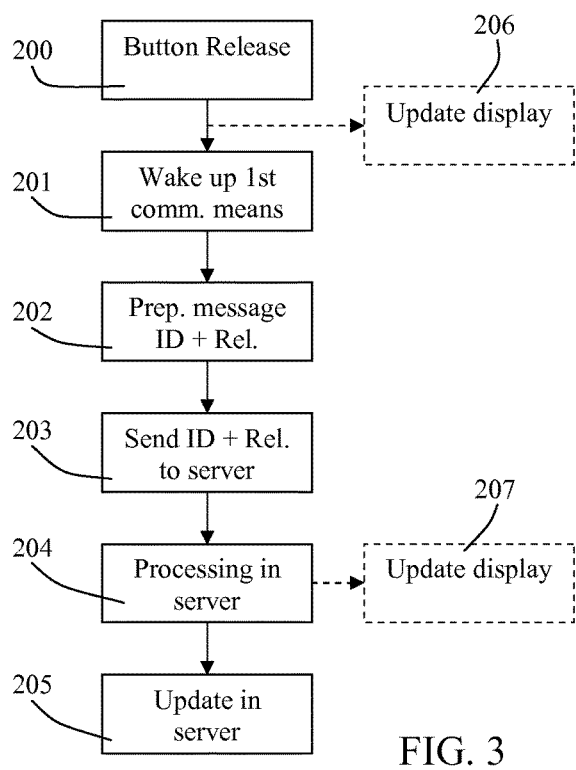# 
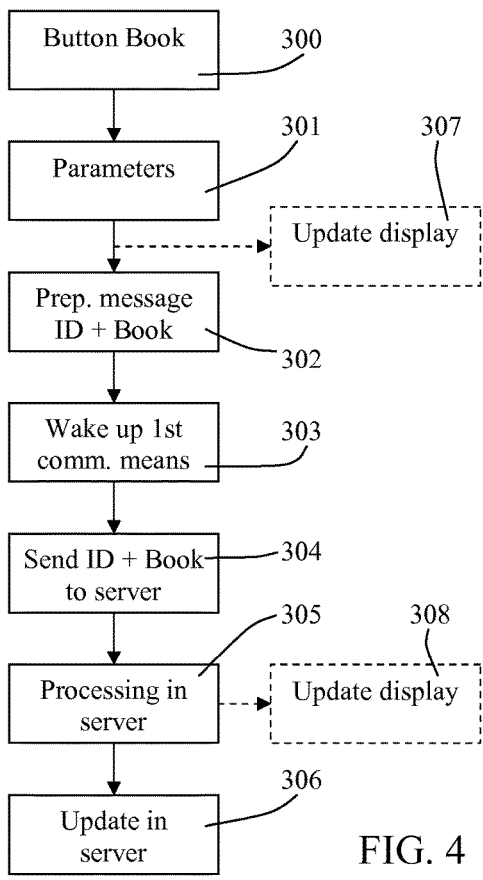
FIG. 2
FIG. 3
FIG. 4

SYSTEM, METHOD AND DISPLAY DEVICE FOR MANAGING THE OCCUPATION OF SHARED SPACES

TECHNICAL FIELD

The present invention concerns a system and a method for managing the occupation of shared spaces or shared resources such as meeting rooms or shared desks. The invention also concerns a display device for displaying the status of shared spaces.

BACKGROUND ART

There are currently different systems and methods allowing for the management, planning and recording of the reservation of shared spaces or resources such as rooms or shared desks for example, in buildings such as office buildings, offices, conference centers and other buildings where the shared spaces can be booked for use by different users. These systems often comprise a central server which receives all booking requests and which enables visualizing the state of booking and of occupation of the shared spaces, from one or more workstations.

Booking information, once it is stored in the central server, must be distributed in order to be available at the corresponding premises, namely close to the shared spaces. In addition, the information should be updated if possible in real time or at least with a small time lag in order to closely reflect the reality.

This updating of information is generally very tedious. Indeed, it often happens in practice that the actual occupation of a shared space does not correspond to the occupation as it was intended and as stored in the central server. This may arise in particular because some planned meetings are canceled without the central server being informed, because some meetings last longer than expected, which requires use of the shared space longer than the length of booking, or otherwise, because a meeting lasts less time than expected and therefore the booked shared space is free and available sooner than expected.

Different systems have been developed and implemented to try to solve the problems described above. In such systems, display screens are placed close to the shared spaces for which the booking is to be managed. These screens communicate with the central server and are usually able to display the part of the content of the central server concerning the shared space close to which they are placed.

Most of the existing systems have several drawbacks. As the screen is often formed of a touch pad, it provides access to several functions. As a corollary, these devices can often be complex to use. Moreover, they are generally relatively expensive.

Another disadvantage is that these screens are big energy consumers. Therefore, they usually require a cabled power supply. Such a power supply may be provided during the construction of a building, but it is economically less interesting when an existing building has to be equipped if the wiring required for powering the screens was not taken into account at the time the building was designed.

A screen of the type mentioned above is described in the International application WO 2010/151211. In this document, a display device is connected to a scheduling server which is responsible for the management of resources such as a shared space. This display device receives messages from the scheduling server and updates the display if necessary. This display device may also send messages to the scheduling server to confirm that a meeting began for example.

The proposed display device as well as the communication means are high consumption systems. Therefore, the display must be wired to be used in practice.

Because of the different functions available, these screens can be interesting to be used as standalone devices, that is to say, even beyond the reach of the central server. It follows that there is a risk of theft. It is therefore prudent to provide fastening systems that reduce this risk, but that again increase installation costs.

These various disadvantages imply that in practice, such display devices are not commonly used.

U.S. Pat. No. 8,185,762 describes a room management system that uses low-energy screens requiring no cabled power supply. The main feature of the system described in this US patent is that the screens are powered by energy harvesting. Due to the energy sources used, it is not possible to obtain sufficient power to use communication protocols requiring a lot of energy, such as, for example the widely adopted WiFi protocol. It is therefore necessary to use another dedicated communication protocol, which will often require the installation of a specific wireless infrastructure with dedicated base-stations and antennas. This makes the system very inflexible.

Other publications describe inventions aimed at solving the above mentioned problems. One of them is the European application EP 2 479 958. This document describes a system comprising a registration device and a management unit. The system further comprises a mobile handset that is used for indicating that a participant of a meeting has checked in to a scheduled meeting. This document does not deal with the optimization of energy consumption.

The document WO 2003/003613 describes a system for remotely controlling a distributed network of signs. The signs are displayed on a plurality of low power consuming electronic display devices. According to this document, the electronic components must be powered by a power supply "sufficient to meet the power requirements of the display driver, the communication device and the microcontroller".

The developments described in the above document concern, for the most part, the optimization of the power supply to meet the above mentioned requirement. However, the document does not provide for communication from the display devices to the server.

None of the documents summarized above describes a system for managing in a practical and efficient way, the occupation of shared spaces, practical and efficient meaning among others, that there is no need for a complex installation of the display devices.

SUMMARY OF THE INVENTION

The present invention proposes to overcome the drawbacks of the prior art systems and to provide a management system and a method that require no cabled power source while allowing for information concerning the occupation of rooms or other shared spaces to be updated in real-time. Furthermore, the system requires no energy harvesting or battery replacement, which makes this system easier and cheaper to manage and to produce. The system is also very flexible, which means that it can be adapted to use existing communication structures. This implies that the system does often not require the installation of a proprietary or dedicated structure or the use of a proprietary communication protocol, but it can on the contrary benefit from the existing infrastructures.

The drawbacks associated with the prior art are also avoided thanks to a display device according to this invention.

An object of the invention is achieved by a system for managing the occupation of at least one shared space, comprising at least a display device at the shared space, configured to display a status of availability of the shared space, a central server and at least a first communication means between the display device and said central server, said first communication means having an active and an inactive mode, said first communication means comprising a bidirectional wireless first communication channel, said first communication means being in inactive mode by default and comprising a first display device communication module placed in the display device and a first server communication module connected to the central server, said first display device communication module being switched off when the first communication means is in inactive mode and being switched on when said first communication means is in active mode, said display device comprising a bistable display and activating means of said first communication means, characterized in that said system further comprises a second communication means designed to allow reception by the display devices, of messages from the central server, said second communication means comprising a second display device communication module placed in the display device, and a second server communication module connected to the central server, in that said second display device communication module has a lower power consumption than said first display device communication module when this first display device communication module is switched on, and in that said second display device communication module is part of said activation means of the first communication means.

Another object of the invention is achieved by a method for managing the occupation of shared spaces by means of a management system comprising at least:
  a display device at the shared space whose occupation is to be managed,
  a central server,
  a first communication means enabling a bidirectional communication between the central server and the display device, said first communication means comprising a first communication channel, a first server communication module and a first display device communication module, wherein said first display device communication module can be switched on or switched off,
  activation means of said first communication means,
  a second communication means designed to allow for the reception by the display devices, of messages from the central server, said second communication means comprising a second communication channel and a second display device communication module placed in the display device and having a lower power consumption than said first display device communication module when said first display device communication module is switched on, and said second display device communication module being part of said activation means,
said method being characterized in that it comprises the steps of:
  placing said first communication means in inactive mode by switching off said first display device communication module when no information is to be exchanged between the display device and the central server;
  monitoring the activation means to determine whether information is to be exchanged between the display device and the central server;
  if information is to be exchanged between the display device and the central server, than switching the first display device communication module on via the second display device communication module, and exchanging information between the central server and the display device using the first communication means.

Objects of the invention are further achieved by a display device for displaying a status of availability of shared spaces, said display device comprising a first display device communication module for a bidirectional communication with a central server via a first communication channel, wherein said first display device communication module can be switched on and switched off, characterized in that said display device further comprises a second display device communication module for communicating with said central server through a second communication channel, in that said second display device communication module has a lower power consumption then said first display device communication module when this first display device communication module is switched on, and in that said display device further comprises activation means for switching the first display device communication module on, said second display device communication module being part of said activation means.

In a system according to an embodiment of the invention, updating of information can be made in real time or with a short time lag, typically at most a few minutes. This update can be done using information from the central server and transmitted to the relevant display devices. The update can also be done on the basis of information input by a user on a display device through a dedicated touch area or a button for example, and transmitted to the central server. When the update originates from the central server, it is directly visible on a screen placed near the shared space in question.

The display of information, as well as the transfer of information from the central server to the display devices or vice versa, from a display device to a central server, consumes a given amount of energy. This amount of energy is consumed only when information is transferred between the central server and one or several display devices.

Since there is typically only a small number of information updates during a day, it follows that the screens do not need to be powered by a cabled power supply. Despite of this, the system according to the invention provides sufficient power to use conventional communication means and large energy consuming protocols, such as WiFi. The system described herein is very flexible. This means that it can use to some extent, infrastructures existing in the building in which it is installed. This further means that the implementation or installation of the system is greatly simplified.

In addition, the system according to the invention is very simple and intuitive to use and does not require any training. Another advantage coming from the ease of use is that people who want to occupy a shared space that they have not previously booked can indicate very easily that they intend to book the shared space. Unlike the majority of existing wireless or non-cabled systems, it is not necessary to go through a tedious and/or relatively long process to inform the central server that a shared space is booked. In practice, if a user has to apply a procedure, even slightly tedious, such as simply sending a request to the central server by e-mail, a user may not always respect the procedure, particularly in the case of a spontaneous reservation where other people are involved and are waiting for the meeting to start.

Similarly, when a meeting is finished, especially when it ends earlier than expected, with the known systems, it is very rare in practice, that the person who booked the shared space is concerned with informing the central server that the shared space is now available. In contrast, with the system of the invention and thanks to its ease of use, users tend to inform the central server that the shared space is released. It is also possible to couple the management system with a presence detector or other suitable IoT (Internet of Things) sensors in the shared space, so as to automatically inform the central server that the shared space is released.

Because the information available on the central server actually corresponds to the occupation of the shared spaces, it is possible to generate reliable statistics. For example it is possible to compare the reservations made on the central server with the actual use of the shared spaces, allowing for better management of the occupation of the shared spaces in a building.

In the wireless systems of the prior art, such statistics are often not reliable because the recorded occupation of the shared spaces is often not very trustworthy.

BRIEF DESCRIPTION OF DRAWINGS

The present invention and its advantages will be better understood with reference to the enclosed figures and to the detailed description of specific embodiments, wherein:

FIG. 2 shows is a block diagram of a part of the method of the invention;

FIG. 3 illustrates another part of the method of the invention; and

FIG. 4 is a block diagram of still another part of the method of the invention.

MODES FOR CARRYING OUT THE INVENTION

Figure 1:
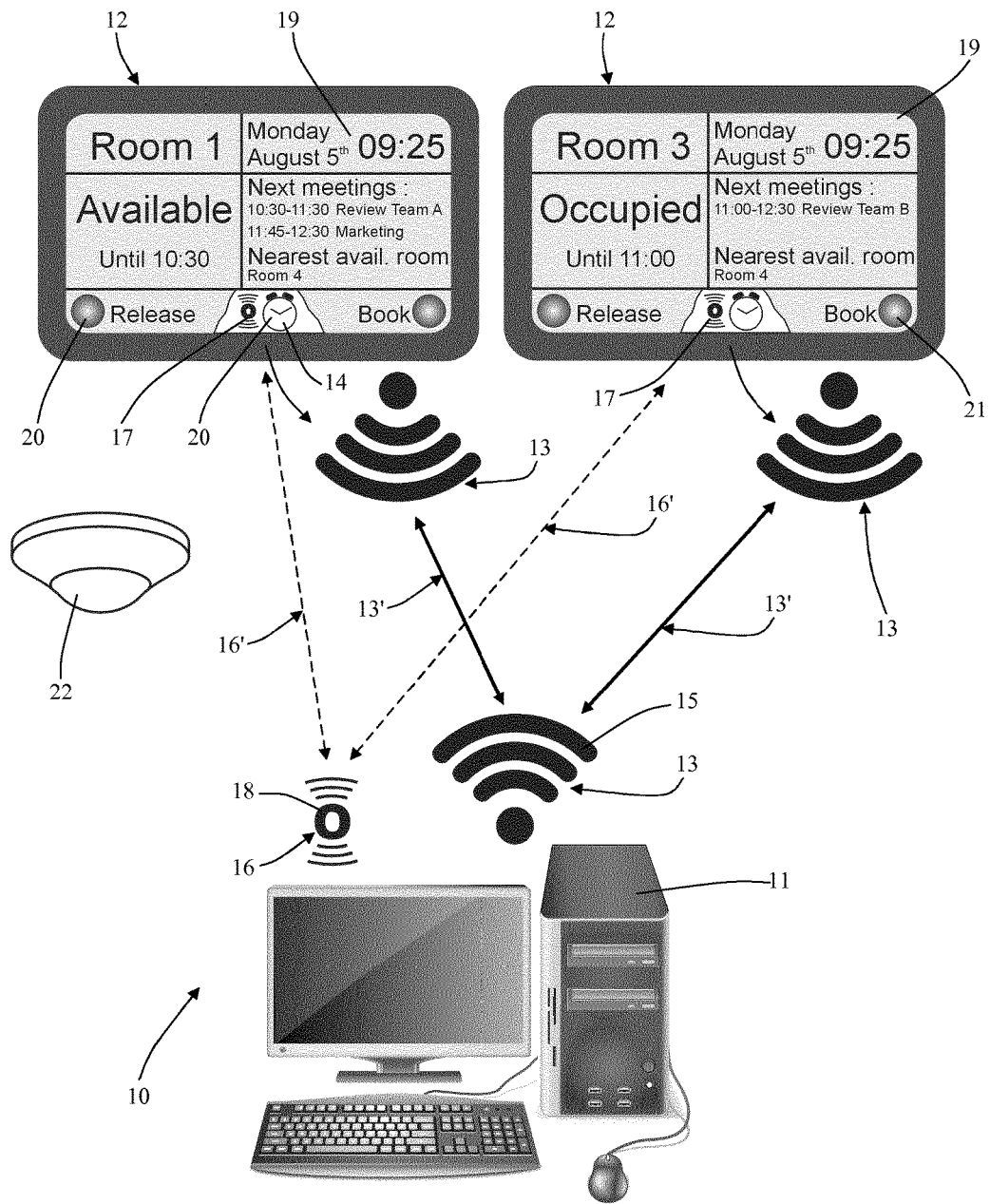
FIG. 1 illustrates a schematic view of a system of an embodiment of the invention.

Referring to the drawings and in particular to FIG. 1, the invention concerns a system 10 for managing the occupation of shared spaces, for example meeting rooms. The description refers to rooms. It should however be understood that the invention also applies to other kinds of shared spaces or resources such as for example open space offices or shared desks for example.

This system comprises a central server 11 arranged to manage information relating to occupation of rooms, and a display device 12 placed near each room or shared space whose occupation is managed.

In FIG. 1, two display devices 12 are shown, corresponding to two different rooms. It is clear that in practice, a larger number of rooms can be managed.

According to an embodiment, each room is associated with an independent display device 12 and each display device 12 is associated with a different room. According to embodiments, it is possible to use a display device 12 for managing more than one room, for example two rooms. In a concrete embodiment, the display device may be placed between two doors of two different rooms and may comprise two areas, for example an area in the right part of a screen of the display device used for viewing information concerning the room whose door is to the right of the display device and an area on the left side of the screen used to display information concerning the room whose door is left of the display device. More generally, the display device of the invention may have at least two areas, different areas of the display device being used to display the status of a different room. This can be advantageous in that the display device can use common electronic components to manage two or more different rooms.

Alternatively, it is also possible to provide a display device having a modular display that can be adapted to a modular room. For a room that can be split into two or more rooms, the display device may have a modified display depending on whether the room is used in whole or split. The display device may also however remain similar regardless of the fact that the room is used in whole or split.

The central server 11 as used in the invention is able to receive requests for reservations or other requests for information related to the management of the rooms. Such information or requests may come from different user devices such as for example computers, tablets, mobile phones, etc. The central server 11 can for example reside physically in the same building as the displays devices 12, or it can reside as a virtual (remote) server in the cloud.

The system of the invention further comprises first communication means 13 provided to allow a bidirectional communication between the central server 11 and the display devices 12. The first communication means are wireless. They comprise a first communication channel 13', a first display device communication module 14, placed in the display device 12, and a first server communication module 15 connected to the central server 11. The first communication means 13 may take active or inactive states. When in the active state or mode, the first display device communication module 14 is switched on and information can be exchanged between the central server 11 and the corresponding display devices 12. This information may be issued by the central server to a display device, for example in the case where an update of the status of the related room must be made. Communication can also be performed from the display device 12 to the central server 11, for example in the case where the display device comprises means for indicating a change in the status of the room.

When the first communication means 13 is in the inactive mode or inactive state, the first display device communication module 14 is switched off. This means firstly that it can not receive messages from the central server via the first communication channel 13' and secondly, that it consumes no energy.

The first communication means 13 can in particular use any of the communication protocols chosen from Wi Fi, Bluetooth, WiBro, WiMAX, GPRS, UMTS and LTE. These protocols are designed to allow the conveying of messages having a large amount of data. Typically, messages comprising information concerning the availability of a shared space can be conveyed through such a protocol.

The system of the invention also comprises second communication means 16. The second communication means 16 comprises a second communication channel 16', a second display device communication module 17, placed in the display device 12, and a second server communication module 18, connected to the central server 11. The second communication means 16 have lower power consumption than the first communication means 13, when in the same conditions, that is to say when the first and second communication means are in active mode. More specifically, the second display device communication module 17 has lower power consumption than the first display device communication module 14 when the first communication means 13 are in active mode, i.e. when this first display device communication module 14 is switched on.

These second communication means 16 advantageously use at least one of the communication protocols selected from LPWAN, LoRaWAN, SigFox, ZigBee, Bluetooth, Bluetooth Low Energy, 6LoWPAN, ANT, RFID and NFC.

These protocols are optimized for the purpose of reducing energy consumption, i.e. they consume a very small amount of energy. However, they are not able to convey messages having a great amount of data.

The display devices 12 according to the invention comprise a display screen 19 which, in a preferred embodiment, is a bistable display or electronic ink, also known as electronic paper. The display screen can be a black and white or color screen. This type of screen uses energy for displaying information only during a change of state of the display. As long as the content on the display is not changed, such a screen consumes no power.

The first communication means 13 make it possible to communicate a large amount of data, but involve greater energy consumption than that involved when using the second communication means 16.

According to an exemplary embodiment, the second communication means 16 use the communication protocol known as LoRaWan. This communication protocol is particularly interesting in that it consumes very little energy. On the other hand, it does not allow for the transfer of large amounts of data.

The display device 12 according to the invention further comprises activation means 20 of said first communication means 13. These activation means are of two different types, one of these two different types being used when information is to be transmitted from the central server 11 to a display device 12 and the other type being used when information is to be transmitted from a display device 12 to the central server 11. In the case where information is to be transmitted from the central server 11 to a display device 12, the activating means 20 comprises said second display device communication module 17. In the case where information must be transmitted from a display device 12 to the central server 11, the activating means 20 comprises an activation element 21 arranged on the display device and operable by a user.

In practice, the activation element 21 will be on a touch-sensitive area of the screen of the display device 12, this touch-sensitive area detecting touch by a user through a capacitive, resistive or infrared measurement for example. Alternatively, the activating element may also comprise one or more buttons which act mechanically to activate the first communication means 13.

The display device 12 of the invention further comprises a power supply (not shown) that comprises an energy storage device. Such an energy storage device may be a rechargeable battery, a super-capacitor, a battery, solar cells or a fuel cell for example.

The storage device of the invention may have sufficient stored energy, in comparison with the consumption of the display device, so that it is not necessary to replace it during the entire lifetime of the display device 12, typically several years. It is however also possible to provide a replaceable energy storage device or a rechargeable storage device. Alternatively, the energy storage device may be rechargeable by a contactless electrical energy transmission system such as for example inductive charging.

The system of the invention may be coupled to a presence detector 22 or a counter arranged in or at the entrance of a room. The presence detector 22 may determine whether a room is empty or occupied and provide this information to the corresponding display device 12. The transmission can be done for example at regular intervals or at a change of status. A counter can also be installed at the entrance of a room and count the number of people entering and leaving the room and thereby determine whether the room is empty or not. The transmission of information from the presence detector 22 to the display device 12 may be done for example using the second communication means 16 and in particular, the second display device communication module 17, the second communication channel 16' and the "low consumption" communication protocol associated with it. Other IoT (Internet of Things) sensors may also be used to determine the status of the room.

The display device 12 further comprises a processing module in charge of processing requests and messages. These requests and messages can be intended for the central server or can originate from the central server.

The method of the invention is described with reference to a particular embodiment illustrated by FIGS. 2 to 4. First, we will assume that a meeting room has been booked pursuant to a request made at the central server 11. The central server must thus update the display of the related room. This is illustrated by FIG. 2. A message must be sent from the central server 11 to the display device 12 associated with the room in question.

By default, the first communication means 13, which is a communication means allowing for the transfer of large amounts of data, is in inactive mode on the display device. In other words, the first display device communication module 14 is switched off. The display device 12 is thus not able to receive a message from the central server 11, via the first communication means 13.

In the specific example shown in FIG. 2, the central server 11 determines, in step 100, which room is concerned by the update. The central server then sends a message or a request to the associated display device 12, in step 101, via the second communication channel 16'. This second communication channel is, however, not able to process large amounts of data. Therefore, it cannot be used to update the information on the occupation or availability of the room in an efficient manner.

The request sent by the central server 11 via the said second communication channel 16' contains an active mode-setting instruction or a wake-up command for said first communication means 13. This instruction preferably comprises an identifier of the corresponding display device. This makes it possible to switch on only the display device whose display should be updated. More specifically, said instruction has the effect of switching on the first display device communication module 14.

Alternatively, it is also possible not to include an identifier of the display device in the request. In this case, all the display devices 12 switch their first communication means 13 to active mode or switch the first display device communication module 14 on when a request is received. This can be advantageous particularly in the case where some display devices display information not only about the room which they are associated, but also about other rooms. This information may, for example be the name or the number of the nearest available room or the total number of empty or available rooms.

Where a display device 12 has received, via the second communication channel 16' and the second display device communication module 17, a request that concerns that particular display device, the activation command or switch on command contained in the request is executed. This activation command will set the first communication means 13 in active mode and therefore switches the first display device communication module 14 on. At this point, an update message can be sent by the central server 11. This is done in a step 102. According to a preferred embodiment, the update message is transmitted to the corresponding display device 12. It is also possible to prepare messages for other display devices, for example, all display devices for which the information displayed must be changed. These messages are sent via the first communication means and contain an identifier of the corresponding display devices. According to variants, these messages can be sent in encrypted or secure form or in clear.

Upon receipt of a message, depending on the implementation, the display device 12 determines whether the message is of relevance to it. It is also possible that the display devices only receive messages that are relevant to them, in which case, this determination is not necessary. Verification may in particular be carried out by means of an identifier contained in the message on the one hand and stored in a memory of the display device on the other hand. If the message concerns the display device in question, that message is processed by the processing module of the display device to extract information to display. This step has the reference 103 in FIG. 2. The information is then displayed on the screen of the display device. This corresponds to a step 104.

In some implementations, instead of sending an identifier, the message may contain an array of bits whereas each display is associated with a particular bit inside this array. In this case, checking the state of a particular bit inside the message may indicate a display device whether it is concerned or not by the message.

When the message has been processed, the first communication means 13 can return to inactive mode, the first display device communication module 14 being consequently switched off. This can be done automatically after a certain period, typically 1 to 5 seconds, counted from the time when the first communication means 13 has been activated. Otherwise a deactivation command can be sent by the central server 11.

In this way, the first communication means 13, allowing for the transmission of large amounts of data, but consuming a significant amount of energy, is in active mode during a very short time. The first communication means is activated by the activation means 20, said activation means receiving a command via the second communication means 16, which in turn, requires very low amounts of energy, but is unable to handle large amounts of information.

The second communication means 16 may be in active mode continuously or may be deactivated and reactivated intermittently. Since the second communication means are provided to receive messages from the server, it is advantageous that the duration of inactivity of the second communication means does not exceed the average length of time during which a message is sent. To achieve this, the second communication means typically has a synchronization mechanism where the receivers will synchronize to beacon messages that are being sent by a sender in predetermined intervals and whereas the communication means can be put in inactive mode between beacons.

It is apparent from the description above that the first and second communication means are distinct from each other and do not use the same communication protocol. This enables choosing the best or most efficient solution for each of the communication means and allows for a great adaptability of the system. This also allows for the deployment of the system in places where existing communication infrastructures are already operable.

In some implementations, the second communication means 16 could also be placed in inactive mode during a predefined time period, for example at night or at times during which the meeting rooms are not being used. This reduces energy consumption and thus extends the lifetime of the display device.

The above description concerns the case where updates are sent from the central server 11 to the display devices 12. This embodiment might be enough for a functional system. However, it is also possible to add the ability to update room management information entered from one of the display devices 12. For this purpose, the activation elements 21 of said first communication means 13 are used.

For example, a display device illustrated by FIG. 1 comprises two activation elements, one denoted "Release" being provided to indicate that the relevant room is released and the other, denoted "Book" is provided to indicate that a user wants to book the related room.

In a first example shown in FIG. 3, we suppose that a user wishes to indicate that the room is now vacant by pressing the button marked "Release". This step has the reference 200 in FIG. 3. This action has the effect of sending a wake-up or activating command or switch on message to the first communication means 13 and to place the first communication means in active mode. In other words, the activation command activates or switches the first display device communication module 14 on. This step is referenced 201. A message is generated by the processing module of the display device in step 202, this message comprising for example an identifier of the related display device and a command indicating that the room is released. This command may for example be a single bit. The message is then sent, in step 203, from the display device to the central server by the first communication means 13 using the first communication channel 13'. This message is then processed conventionally in step 204. In particular, it is taken into account to update the status information in the database of the central server 11 in step 206 and the status can be passed to one or more display devices.

According to a variant of the invention, when the "Release" button of a display device is pressed, the update of the display on this display device is made directly in the corresponding display device. This corresponds to step 206 of FIG. 3. The processing of the information concerning the release of a room is thus performed locally.

Alternatively, information concerning the release of the room is transmitted to the central server 11 and the central server handles the updating of the display on the corresponding display device. This is illustrated by the reference 207 in FIG. 3. The processing of the information concerning the release of a room is thus performed remotely. It is also possible to provide a combination of both modes; eg a local update when actuating the "Release" button and remote update thereafter. At the end of the update, the first communication means 13 is reset to the inactive mode and the first display device communication module 14 is therefore switched off.

In a second example shown in FIG. 4, we suppose that a user wants to book a free room by acting on the display device of the related room. He/she then presses the button displaying "Book" on the display device in question, which corresponds to step 300. According to various embodiments, it is possible that when the button "Book" is pressed, the room is considered as booked for a fixed predefined period, for example one hour. It is also possible to provide one or more other buttons to indicate either the duration of the booking or the end time of the booking. According to another variant, it is possible to provide that for each press of the button "Book", the duration of booking is increased by a predefined fixed period. For example, each press of the button "Book" could increase the length of booking by a duration of 15 minutes. Thus, four consecutive pressures on that button would reserve the room for one hour. The screen of the display device can be used to display instructions or information to the user, in particular to indicate what the currently saved settings are and how to change them. The starting time of the booking can be the time when the booking button is pressed or a time input by the user, if this possibility is foreseen. This step of determining the parameters is illustrated by the reference 301 in FIG. 4.

It is possible to store locally in the display device, information concerning the booking for the room associated with this device. Thus, it is possible to prevent a user from booking locally, that is to say from a determined display device, a room that is already booked, which will generate a conflict. Such conflicts can be treated without necessarily resorting to the central server.

When the setting of the booking parameters is completed, a message is prepared for the central server. This step has the reference 302. This message may include an identifier of the related display device and a booking instruction. The form and content of the message depends on the implementation. For example, if the booking is always made for a preset fixed duration, the reservation instruction can comprise only one bit. If the reservation is made by predefined fixed increments, this instruction indicates at least the number of increments. If the instruction indicates the start and/or end time of the booking, this instruction should be large enough to include this information.

The method continues with a step of setting the first communication means in active mode and thus, of switching on the first display device communication module 14. This step is referenced 303 in FIG. 4. It comprises sending a wake-up or activating command or switch on message to the first communication means 13.

As in the example illustrated by FIG. 3, the message is then transmitted in step 304, to the central server via the first communication channel 13'. It is then processed in the central server in step 305. If necessary, corresponding messages may be transmitted to other related display devices. The booking data is then updated in the central server in step 306.

As in the example described with reference to FIG. 3, the display on the display device from which the reservation was made can be made locally, which corresponds to reference 307 in FIG. 4 or remotely, which corresponds to reference 308. The remote update uses the central server to change the display.

The display device illustrated in FIG. 1 shows an example of information that can be displayed. This device shows the number or the name of the related room. It indicates the status of the room, which can be available or occupied. An area of the screen indicates until what time this status is valid. The screen also displays the date and time. It provides information on the next meetings to be held in this room, with indications about the time of these meetings. Optionally, an area of the screen also shows the nearest available room.

It is clear that some pieces of information could be removed, such as the display of the date, the name of the room or the nearest available room. On the other hand, other pieces of information could be added such as the status of each rooms or the number of free rooms on a floor of the building, for example.

The data displayed can be set on the central server and implemented on the display devices. It is not essential that each display device shows the same types of information or that a display device always shows the same type of information. In fact, the type of information displayed on a screen can vary depending on the use of the room for example.

Thanks to the ease of use of the system of the invention, when booking through the central server as well as when booking from a display device, and upon release of a room, the data concerning the occupation of a room is in principle correct and accurate. This allows a much better management of the rooms and allows a statistical analysis. For the person who is responsible for managing facilities, the information gathered is reliable. For the users, reliable information is important to use the rooms in an efficient way. In particular, this prevents frustration when the room he had reserved was occupied, as well as when one occupies a free room and that one is "expelled" out of the room shortly after the start of the meeting.

The invention claimed is:

1. A system for managing the occupation of at least one shared space, the system comprising:

a display device located at the shared space and configured to display a status of availability of the shared space, the display device comprising a display, a first display device communication interface having an active mode and an inactive mode and being in an inactive mode by default, and a second display device communication interface, the second display device communication interface having a lower power consumption than the power consumption of the first display device communication interface when the first display device communication interface is in the active mode; and a central server, the central server comprising a first server communication interface and a second server communication interface, the first server communication interface being configured for communication with the first display device communication interface over a first bidirectional wireless channel;

wherein the second display device communication interface is configured to allow reception by the display device of messages from the central server; and wherein the display device is configured to place the first display device communication interface into the active mode in response to receipt of a message from the central server received via the second display device communication interface or in response to a user interaction with the display device.

2. The management system of claim 1, wherein the display device is configured to display an activation element operable by a user to cause the first display device communication interface to be put into the active mode.

3. The management system of claim 1, wherein said first display device communication interface and the first server communication interface are designed to convey messages comprising information concerning the availability of the shared space.

4. The management system of claim 3, said first display device communication interface and the first server communication interface use at least one of the communication protocols selected from the group consisting of WiFi, Bluetooth, WiBro, WiMAX, GPRS, UMTS and LTE.

5. The management system of claim 1, wherein said second display device communication interface and said second server communication interface are low power consumption communication interfaces.

6. The management system of claim 1, wherein said second display device communication interface and second server communication interface are configured to convey a request from the central server to place the first display device communication interface into the active mode.

7. The management system of claim 5, wherein said second display device communication interface and said second server communication interface use at least one of the communication protocols selected from the group consisting of LPWAN, LoRaWAN, SigFox, ZigBee, Bluetooth, Bluetooth Low Energy, 6LoWPAN, ANT, RFID and NFC.

8. The management system of claim 1, wherein the display device is coupled to at least one detector placed in a shared space and arranged to determine the current status of availability of this shared space and to transmit the current status to the display device.

9. The management system of claim 1, wherein the display is a bistable display.

10. The management system of claim 1, wherein the display device is further configured to send a message to the server using the first display device communication interface in response to the user interaction with the display device.

11. A method for managing occupation of shared spaces by means of a management system, the method comprising:
providing a display device located at the shared space, the display device being configured to display a status of availability of the shared space, the display device comprising a bistable display, a first display device communication interface having an active mode and an inactive mode and being in an inactive mode by default, and a second display device communication interface, the second display device communication interface having a lower power consumption than a power consumption of the first display device communication interface when the first display device communication interface is in the active mode, wherein the first display device communication interface is configured for communication with a first server communication interface of a central server over a first bidirectional wireless channel and wherein the second display device communication interface is configured for communication with a second server communication interface of the central server to allow reception by the display device of messages from the central server;
placing the first display device communication interface in the inactive mode when no information is to be exchanged between the display device and the central server;
making a determination that there is information to be exchanged between the display device and the central server; and
placing the first display device communication interface into the active mode in response to the determination.

12. The method according to claim 11, wherein determining whether information is to be exchanged between the display device and the central server comprises receiving, via the second display device communication interface, a message from the central server.

13. The method according to claim 11, wherein determining whether information is to be exchanged between the display device and the central server comprises detecting an interaction with the display device by the user.

14. The method according to claim 13, further comprising the step of sending a message to the server using the first display device communication interface in response to the interaction with the display device by the user.

15. A display device for displaying a status of availability of shared spaces, the display device comprising:
a display;
a first display device communication interface having an active mode and an inactive mode and being in an inactive mode by default; and
a second display device communication interface, the second display device communication interface having a lower power consumption than a power consumption of the first display device communication interface when the first display device communication interface is in the active mode, wherein the first display device communication interface is configured for communication with a first server communication interface of a central server over a first bidirectional wireless channel and wherein the second display device communication interface is configured for communication with a second server communication interface of the central server to allow reception by the display device of messages from the central server;
wherein the display device is configured to place the first display device communication interface into the active mode in response to receipt of a message from the central server received via the second display device communication interface or in response to a user interaction with the display device.

16. The display device of claim 15, further configured to display an activation element operable by a user to cause the display device to put the first display device communication interface into the active mode.

17. The display device of claim 15, wherein the first display device communication module interface is configured for reception of messages from the central sever comprising information concerning the availability of the shared space.

18. The display device of claim 15, wherein said second display device communication module interface uses a low power consumption communication protocol.

19. The display device of claim 15, wherein the low power consumption communication protocol is a communication protocol selected from the group consisting of LPWAN, LoRaWAN, SigFox, ZigBee, Bluetooth, Bluetooth Low Energy, 6LoWPAN, ANT, RFID and NFC.

20. The display device of claim 15, wherein the first display device communication interface uses at least one of the communication protocols selected from the group consisting of WiFi, Bluetooth, WiBro, WiMAX, GPRS, UMTS and LTE.

* * * * *